L. J. ZIMMERMAN.
ATTACHMENT FOR EYEGLASSES.
APPLICATION FILED MAY 13, 1921.
1,395,625.
Patented Nov. 1, 1921.
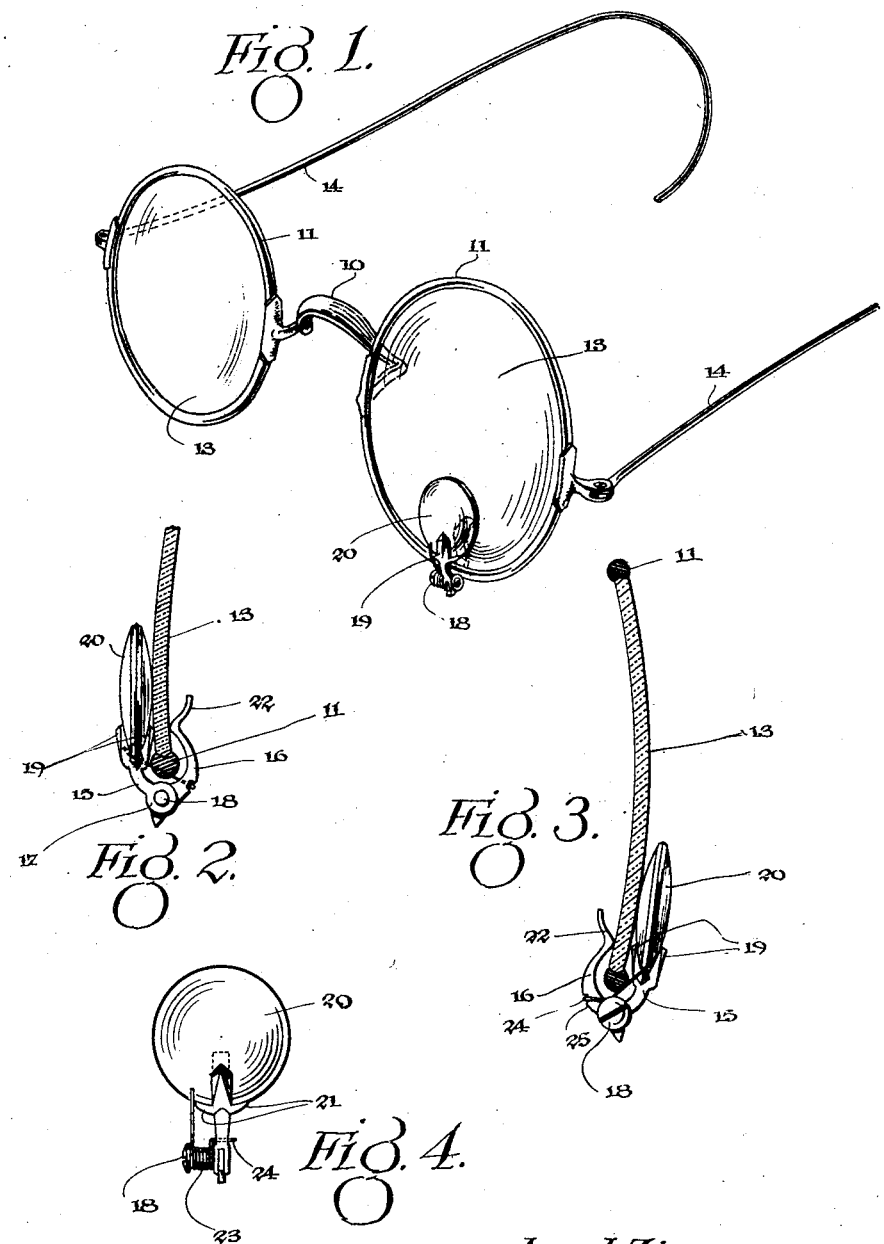
WITNESSES
Leo J. Zimmerman.
INVENTOR
BY
ATTORNEYS

UNITED STATES PATENT OFFICE.

LEO JAY ZIMMERMAN, OF LADYSMITH, WISCONSIN.

ATTACHMENT FOR EYEGLASSES.

1,395,625.  Specification of Letters Patent.  Patented Nov. 1, 1921.

Application filed May 13, 1921. Serial No. 469,184.

*To all whom it may concern:*

Be it known that I, LEO J. ZIMMERMAN, a citizen of the United States, and a resident of Ladysmith, in the county of Rusk and State of Wisconsin, have invented certain new and useful Improvements in Attachments for Eyeglasses, of which the following is a specification.

This invention relates to an attachment for eyeglasses.

The object of the invention is to provide a device by which a magnifying lens may be quickly and easily attached or detached to a pair of eyeglasses.

It is also an object of the invention that the device for carrying the magnifying lens be simple in construction and inexpensive to manufacture.

Other objects and objects relating to details of construction, combination and arrangement of parts will hereinafter appear in the detailed description to follow.

The invention is illustrated by way of example in the accompanying drawings in which—

Figure 1 is a perspective view of a pair of glasses having the present invention applied thereto, Fig. 2 is a fragmentary sectional view of the eye glass to which the attachment is applied and showing in elevation one side of the attachment, Fig. 3 is a vertical sectional view of the same eye glass shown in Fig. 2, and showing in elevation the other side of the attachment, Fig. 4 is a front elevation of the attachment.

Referring to the drawings more particularly, 10 indicates the bridge piece of a pair of eye glasses which is connected at each of its ends in the usual manner to an eye lens supporting rim 11. Each rim 11 supports an eye lens 13, and also each rim has suitably connected therewith a bow 14.

In carrying out the present invention, there is provided a pair of clamping members 15 and 16. The member 15 has formed at its lower end a bifurcated hub portion 17 in which the similar end of the member 16 extends, said end being formed with a suitable eyelet so that the same may be pivotally connected with the member 16 by the means of a screw 18, the screw 18 extending from one side of the bifurcated end of the member 15, as shown in Fig. 4, for a purpose which will later become evident.

The upper end of the member 15 is formed with a pair of jaws 19 which are adapted to support therebetween a magnifying lens 20, said lens being preferably of the shape shown and further supported against removal by the means of projections 21 formed upon each side of the member 15, as shown in Figs. 1 and 4. Also it will be observed that each member 15 and 16 is slightly curved toward each other so that they may clamp upon the eye lens 13 and also that the free end of the member 16 has a slightly outwardly curved portion as at 22, the purpose of which will later be explained.

A spring 23 is associated with the members 15 and 16 in such a manner that they will be caused to press toward each other and thus clampingly engage upon a lens of a pair of glasses as shown in the drawings. More particularly, the spring 23 comprises a continuous wire, the greater portion of which is wound about the extended portion of the pivot screw 18 as shown in Fig. 4, and its one end bent at right angles as at 24 and disposed in a notch 25 formed in the outer edge of the member 16, while the other end of the spring wire is disposed upon the forward surface of the lens 20 as shown. As is obvious the tendency of the spring 23 is to press the members 15 and 16 toward one another.

In the use of the present device, the same may be quickly and easily applied or attached to any conventional pair of glasses merely by inserting the finger on the inner side of the portion 22 of the member 16, and pressing outwardly, and also at the same time pressing in the opposite direction upon the lens 20. The two members 15 and 16 may in this manner be spread apart sufficient to engage over the lens 13, and then upon freeing the finger engaging the portion 22, the two members will clamp upon the eye lens as shown. When it is desired to remove the attachment, then it is only necessary to again press outwardly upon the members 16 so that the attachment as a whole may be disengaged from the eye lens.

It may be here mentioned that the present device is particularly valuable for watch makers or anyone requiring the constant use of a strong magnifying glass.

I claim:—

1. An attachment of the character described, comprising a pair of members pivotally connected at their one ends, a lens supported by the free end of one of said members, and spring means associated with said members whereby they will be caused to press toward one another.

2. An attachment of the character described, comprising an inner and an outer member pivotally connected at their one ends, a lens carried by the free end of the outer member, and a coil spring associated with said members and adapted to cause them to press toward each other.

3. An attachment of the character described, comprising an inner and an outer member pivotally connected at their one ends, a lens carried by the free end of the outer member, a finger engaging portion formed on the free end of the inner member, and spring means associated with said members adapted to cause them to press toward each other.

4. An attachment of the character described, comprising an inner and an outer member pivotally connected at their one ends, the outer member having its free end formed with a pair of jaws and the other member having its like end formed with a finger engaging portion, a lens carried between the jaws of the outer member, and spring means adapted to cause said members to press toward each other.

5. An attachment for eye glasses comprising in combination, an outer and an inner member pivotally connected at their one ends, spring means to cause said members to press toward each other, and said members being curved and under the tension of said spring means adapted to clampingly engage the outer portion of an eye lens, and a lens carried in the free end of said outer member.

6. An attachment for eye glasses comprising in combination, an outer and an inner member pivotally connected at their one ends, spring means to cause said members to press toward each other, and said members being curved and under the tension of said spring means adapted to clampingly engage the outer portion of an eye lens, and a lens carried in the free end of said outer member, and a finger engaging portion formed on the free end of the inner member.

7. An attachment of the character described, comprising a pair of pivoted members, a lens supported thereby, and means associated with said members whereby they will be caused to press toward one another.

LEO JAY ZIMMERMAN.